Dec. 11, 1928.
A. P. THURSBY
DISPLAY DEVICE
Original Filed June 28, 1924
1,695,036
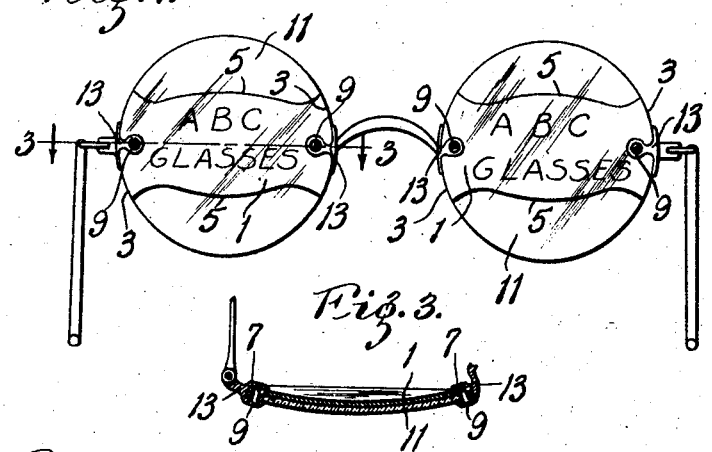
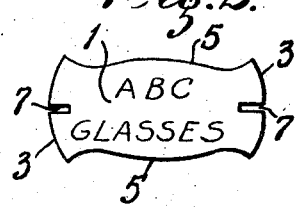
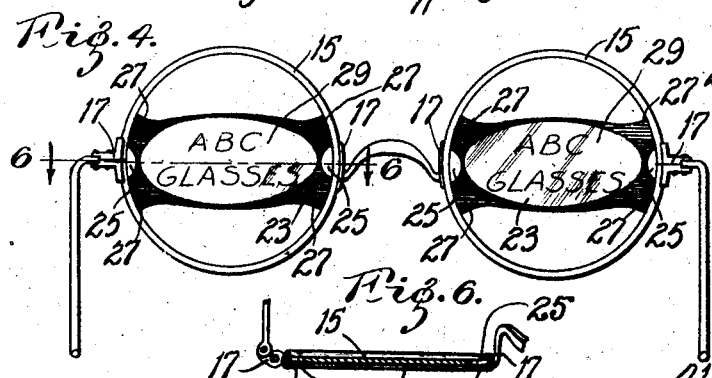
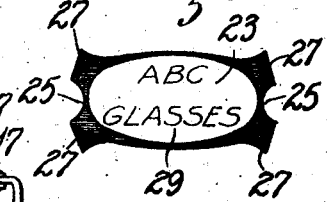
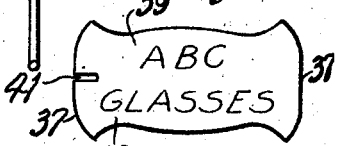
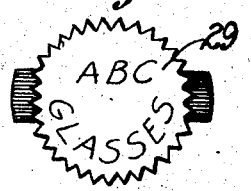
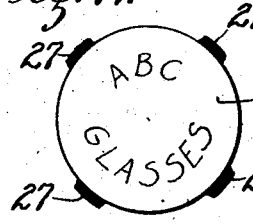

Patented Dec. 11, 1928.

1,695,036

UNITED STATES PATENT OFFICE.

ARTHUR P. THURSBY, OF ST. LOUIS, MISSOURI.

DISPLAY DEVICE.

Application filed June 28, 1924, Serial No. 722,989. Renewed October 12, 1928.

This invention relates to advertising devices and with regard to certain more specific features, to advertising inserts for spectacles, eyeglasses and the like.

Among the several objects of the invention may be noted the provision of a simple and effective medium for drawing attention to an optical display; the provision of means for unmistakably referring or other reference to a particular unit of an optical display; and the provision of an advertising device for optical displays which may be changed from one display unit to another, and yet have a permanent appearance and which may be washed. Other objects will be in part obvious and in part pointed out hereinafter.

The invention accordingly comprises the features of construction, combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a front elevation of a pair of inserts applied to a pair of rimless spectacles;

Fig. 2 is a face view of one insert shown in Fig. 1;

Fig. 3 is a horizontal section on the line 3—3 of Fig. 1;

Fig. 4 is a front elevation of a pair of inserts applied to a pair of rimmed spectacles;

Fig. 5 is a face view of an insert shown in Fig. 4;

Fig. 6 is a horizontal section on the line 6—6 of Fig. 4;

Fig. 7 is a front elevation of a pair of inserts applied to a pair of eyeglasses;

Fig. 8 is a face view of an insert shown in Fig. 7;

Fig. 9 is a horizontal section on the line 9—9 of Fig. 7;

Fig. 10 is a face view of a modified form of insert applicable to the rimmed spectacles shown in Fig. 4; and Fig. 11 is a face view of another modified form of insert.

Similar reference characters indicate corresponding parts throughout the several views of the drawings.

Referring now more particularly to Figs. 1 and 2, there is illustrated an insert piece cut to a general quadrilateral form. It is composed of a light, resilient material, preferably water proof and washable. Celluloid is used in the present embodiment of the invention. It may be stamped on its forward side as illustrated in the drawings, with any suitable legend such as a manufacturer's or dealer's name, a trade-mark, a price-mark, a description or the like.

The insert has arcuate ends 3 adapted to fit the circular or otherwise rounded side portions of a lens. These arcuate ends are joined by means of the edges 5. The edges are cut, not to conform to the lens outline, but to take an artistic path across the lens. The direction and shape of said path may be varied. A preferred form is shown in Figs. 1 and 2. Into the ends 3 are cut the open-ended slots or recesses 7 which are deep enough for purposes hereinafter described. Assuming that a lens of concave section, toric type, is to be used the insert is cut slightly longer than the lateral diameter of the lens, thereby causing it to fit exactly a lens at the arcuate ends when bowed to follow the contour of the glass (Fig. 3).

The insert is applied to the lens of a pair of rimless spectacles as follows: Screws 9 are loosened in the clips 13, thereby permitting the arms of said clips to spring slightly away from the lens, whereupon the ends of the insert may be successively slipped in under the rear arms of the clips, the slots 7 registering with and eneveloping the screws 9. The screws are then drawn up, thereby clamping the insert against the back of the lens by means of clips 13.

The insert is resilient and automatically takes the toric form of the lens and this is because of the end-reactions of the insert against the clips and the clamping action of the same. The device therefore lends itself to an easy and simple construction, because it can be manufactured flat and yet adapts itself to the complex contours often found in lenses.

When rimmed spectacles are to have the inserts applied, the inserts are secured in another manner. The spectacles comprise (Figs. 4 and 6) an internally grooved set of rims 15 with nose and ear piece lugs 17 secured thereto. The lenses are preferably not in place in the internal groove. The insert 23 is preferably cut the same size as the analogous lens dimensions and may be sprung into place within the grooved rim. This type of insert has notches of some shape as at 25 cut from the ends in order to form legs 27.

Since the rims of rimmed spectacles are a prominent feature, the inserts to be applied may have the central advertising space 29 shaped to harmonize with the shape of the rim. The remaining (edge) portions of the insert are darkened in order to obscure them from prominence, thereby leaving the continuity of the rims undisturbed, and giving to the observer the illusion of the display legend suspended in mid-air.

Modifications of the embodiments above set forth for rimmed spectacles are shown in Figs. 10 and 11. No notches 25 are shown in Fig. 10.

A characteristic feature of eye-glasses or pince-nez is the absence of ear-hooks and attending side clips on the lenses (Figs. 7 and 9). The central nose-bridge 31 is fastened to the lenses with clips 33 and screws 35 as is the case with the rimless spectacle. In order to apply the insert to eye glasses the insert is formed as in Fig. 8, the end portions 37 conforming to the shape of the side of the lens 38 and the top and bottom edges 39 artistically formed as described for rimless spectacle inserts. In the case of the eye glass insert, however, only one slot or recess 41 is cut in the end in order that the insert may be slipped under the loosened nose-bridge clips. Upon re-fastening said clips the clamping action of their arms causes the inserts to take approximately the concave lens contour.

Any of the inserts may bear any desired legends, and may be labeled, colored, and/or shaped to suit the particular needs of individual cases. Thus they form an accurate yet flexible and effective system for making and advertising an optical display.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In an advertising device the combination of a pair of spectacles comprising a pair of lenses with nose and ear attachments screwed thereto; an advertising insert comprising a shape of material having slots cut laterally therein for engaging said attachments on one lens; and a legend on the forward or lens side of the insert, said insert conforming to the shape of the lens.

2. In an advertising device the combination of a pair of spectacles comprising a pair of lenses with nose and ear attachments screwed thereto; and a legend-bearing advertising insert comprising a shape of material having slots cut laterally therein for engaging said attachments on one lens, said insert conforming to the shape of the lens.

3. In an advertising device the combination of at least one lens, an attachment therewith, distinct from a lens frame, for applying said lens to the eyes of a user comprising at least one holding element for the lens, also distinct from a lens frame, an advertising insert comprising a shape of resilient material having at least one slot cut therein, thereby leaving extensions adapted to slip under the aforesaid holding element for the lens, whereby the element may be tightened on the insert and the material sprung and held against the lens, said lens having a concave surface to provide means for springing the material.

4. In an advertising device the combination of at least one lens, attachments therewith, distinct from a lens frame, for applying said lens to the eyes of a user comprising holding elements for the lens also distinct from a lens frame, an advertising insert comprising a shape of resilient material having extensions thereon, the major diameter of the insert at the extensions being greater than that of the said lens, whereby when the insert is sprung it will fit the lens, said extensions being adapted to slip in under the said holding element for the lens.

In testimony whereof, I have signed my name to this specification this 25th day of June, 1924.

ARTHUR P. THURSBY.